(12) United States Patent
Feller et al.

(10) Patent No.: US 8,173,967 B2
(45) Date of Patent: May 8, 2012

(54) RADIATION DETECTORS AND RELATED METHODS

(75) Inventors: W. Bruce Feller, Tolland, CT (US); Namdoo Moon, Springfield, VA (US); P. Brian White, Palmer, MA (US); Paul L. White, Sturbridge, MA (US)

(73) Assignee: Nova Scientific, Inc., Sturbridge, MA (US)

( * ) Notice: Subject to any disclaimer, the term of this patent is extended or adjusted under 35 U.S.C. 154(b) by 726 days.

(21) Appl. No.: 12/041,013

(22) Filed: Mar. 3, 2008

(65) Prior Publication Data

US 2010/0001193 A1  Jan. 7, 2010

Related U.S. Application Data

(60) Provisional application No. 60/893,484, filed on Mar. 7, 2007.

(51) Int. Cl.
*G01T 1/20* (2006.01)
*G01T 3/08* (2006.01)
*G01T 3/00* (2006.01)

(52) U.S. Cl. .............. 250/366; 250/370.05; 250/390.01

(58) Field of Classification Search .................. 250/366, 250/390.01–390.12
See application file for complete search history.

(56) References Cited

U.S. PATENT DOCUMENTS

| | | | |
|---|---|---|---|
| 2,244,330 A | 6/1941 | Dickens | |
| 2,740,898 A | 4/1956 | Youmans | 376/153 |
| 4,481,421 A | 11/1984 | Young et al. | 250/390.01 |
| 5,231,290 A | 7/1993 | Czirr et al. | |
| 5,241,569 A * | 8/1993 | Fleming | 376/159 |
| 5,378,895 A * | 1/1995 | Cole et al. | 250/390.04 |
| 5,532,482 A | 7/1996 | Stephenson | 250/269.4 |
| 5,635,711 A | 6/1997 | Sloan et al. | 250/254 |
| 5,659,177 A | 8/1997 | Schulte et al. | |
| 5,734,166 A | 3/1998 | Czirr | |
| 5,973,328 A | 10/1999 | Hiller et al. | 250/390.01 |
| 6,828,714 B2 | 12/2004 | Downing et al. | 313/103 CM |
| 6,876,711 B2 * | 4/2005 | Wallace et al. | 376/154 |
| 7,183,701 B2 | 2/2007 | Downing et al. | 313/103 R |
| 7,233,007 B2 | 6/2007 | Downing et al. | 250/390.11 |
| 7,439,519 B2 | 10/2008 | Feller et al. | |
| 2003/0205956 A1 | 11/2003 | Downing et al. | 313/104 |
| 2004/0256967 A1 | 12/2004 | Downing et al. | 313/103 R |
| 2005/0205798 A1 | 9/2005 | Downing et al. | 250/390.11 |

FOREIGN PATENT DOCUMENTS

WO  98/12576  3/1998

OTHER PUBLICATIONS

Feller et al., "Neutron field imaging with microchannel plates," Proceedings of SPIE, 4141:291-302 (2000).

* cited by examiner

*Primary Examiner* — David Porta
*Assistant Examiner* — Faye Boosalis
(74) *Attorney, Agent, or Firm* — Fish & Richardson P.C.

(57) ABSTRACT

A method includes detecting a neutron based on a time proximity of a first signal and a second signal. The first signal indicates detection of at least one of a neutron and a gamma ray. The second signal indicates detection of a gamma ray. The method further includes measuring an amount of detected gamma rays, for example, an amount different from an amount detected and associated with the second signal.

43 Claims, 2 Drawing Sheets

RADIATION DETECTORS AND RELATED METHODS

CLAIM OF PRIORITY

This application claims priority to U.S. provisional patent application 60/893,484, filed on Mar. 7, 2007, and entitled "Radiation Detectors and Related Methods", hereby incorporated by reference in its entirety.

TECHNICAL FIELD

The invention relates to detectors of radiation (such as neutron radiation and gamma radiation) and related methods.

BACKGROUND

A neutron-sensitive microchannel plate (MCP) can be used to detect special nuclear materials (SNM), such as plutonium. An MCP can be formed by bonding a glass plate between an input electrode and an output electrode, and providing a high voltage direct current (DC) field between the electrodes. The glass plate can include a substantially regular, parallel array of microscopic channels, e.g., cylindrical and hollow channels. Each channel, which can serve as an independent electron multiplier, has an inner wall surface formed of a semiconductive and electron emissive layer.

The glass plate can be doped with, e.g., boron-10 particles, which can capture neutrons in reactions that generate lithium-7 and alpha particles. As the lithium-7 and alpha particles enter nearby channels and collide against the wall surfaces to produce secondary electrons, a cascade of electrons can be formed as the secondary electrons accelerate along the channels (due to the DC field), and collide against the wall surfaces farther along the channels, thereby increasing the number of secondary electrons. The electron cascades develop along the channels and are amplified into detectable signals that are electronically registered.

SUMMARY

In one aspect, the invention features a method including detecting a neutron based on a time proximity of a first signal and a second signal, the first signal indicating detection of at least one of a neutron and a gamma ray, the second signal indicating detection of a gamma ray; and measuring an amount of detected gamma rays, for example, different from an amount detected and associated with the second signal.

Embodiments may include one or more of the following features. The method further includes generating the first signal using a microchannel plate detector. The method further includes generating the second signal using a gamma ray detector. The method further includes determining whether the second signal occurred within a specified time period (e.g., less than 50 nanoseconds, or less than 10 nanoseconds) after occurrence of the first signal. Detecting the neutron includes capturing the neutron using a boron-10 particle and generating alpha and lithium-7 particles. Detecting a neutron includes detecting a gamma ray within less than 50 ns after a microchannel plate detector generates an output pulse indicating detection of a neutron or a gamma ray. Measuring the amount of detected gamma rays includes using a microchannel plate. Measuring the amount of detected gamma rays includes using a photomultiplier tube. Measuring the amount of detected gamma rays includes using an avalanche photodiode. The method further includes totaling an amount of gamma rays detected. The method further includes distinguishing the totaled amount of gamma rays detected from the amount detected and associated with the second signal.

In another aspect, the invention features a method including generating a first signal using a microchannel plate detector, the first signal indicating detection of at least one of a neutron and a gamma ray; generating a second signal using a gamma ray detector, the second signal indicating detection of a gamma ray; generating a third signal indicating that a neutron has been detected by the microchannel plate detector if the second signal occurs within a predetermined time period after occurrence of the first signal; and measuring occurrence of the second signal.

Embodiments may include one or more of the following features. The method further includes comparing a time difference between occurrence of the first signal and occurrence of the second signal. Generating the first signal includes generating the first signal using a microchannel plate detector. Generating the first signal includes generating an alpha particle and a lithium-7 particle; and inducing secondary electron emissions. The predetermined period of time is less than 50 nanoseconds. The method of claim 14, wherein measuring occurrence of the second signal comprises using a microchannel plate. Measuring occurrence of the second signal includes using a photomultiplier tube or an avalanche photodiode. The method further includes totaling an amount of gamma ray detected. The method further includes distinguishing the totaled amount of gamma rays detected from an amount of gamma rays associated with the second signal.

In another aspect, the invention features an apparatus including a neutron detector that detects a neutron based on a time proximity of a first signal and a second signal, the first signal indicating detection of at least one of a neutron and a gamma ray, the second signal indicating detection of a gamma ray; and a device that measures an amount of detected gamma rays, for example, different from an amount detected and associated with the second signal.

Embodiments may include one or more of the following features. The neutron detector includes a microchannel plate detector that generates the first signal. The microchannel plate detector includes glass doped with boron-10. The microchannel plate detector includes glass doped with gadolinium. The neutron detector includes a gamma ray detector that generates the second signal. The neutron detector includes a signal processor that determines whether the second signal occurs within a specified time period (e.g., less than 50 nanoseconds or less than 10 nanoseconds) after occurrence of the first signal. The device includes a microchannel plate. The device includes a photomultiplier tube. The device includes an avalanche photodiode.

In another aspect, the invention features an apparatus including a first microchannel plate detector to generate a first detection signal upon detection of at least one of a neutron and a gamma ray; a gamma ray detector to generate a second detection signal upon detection of a gamma ray; a signal processor to generate a third signal indicating a detection of a neutron upon receiving the first and second detection signals and determining that the second detection signal occurred within a predetermined period of time after occurrence of the first detection signal; and a second microchannel plate spaced from the first microchannel plate detector.

Embodiments may include one or more of the following features. The first microchannel plate detector includes glass doped with at least one of boron-10 and gadolinium. The first microchannel plate detector includes a first particle that, upon capture of a neutron, generates a second particle in an excited state that subsequently decays to a lower energy state and emits a gamma ray. The gamma ray detector includes a scintillator. The predetermined period of time is less than 50 nanoseconds. The second microchannel plate is substantially free of a neutron-sensitive material.

The apparatuses and methods can have one or more of the following advantages. Neutron detection can be more accurate because interference from gamma rays in the environment can be reduced so that false positive detection of neutrons can be reduced. Materials that emit both neutrons and gamma rays can be distinguished from materials that only emit gamma rays. Concurrently, gamma rays can be detected and measured. The apparatuses and methods can be implemented in a wholly solid state and portable device.

Other aspects, features and advantages will be apparent from the description of the embodiments thereof and from the claims.

DETAILED DESCRIPTION

Figure 1:
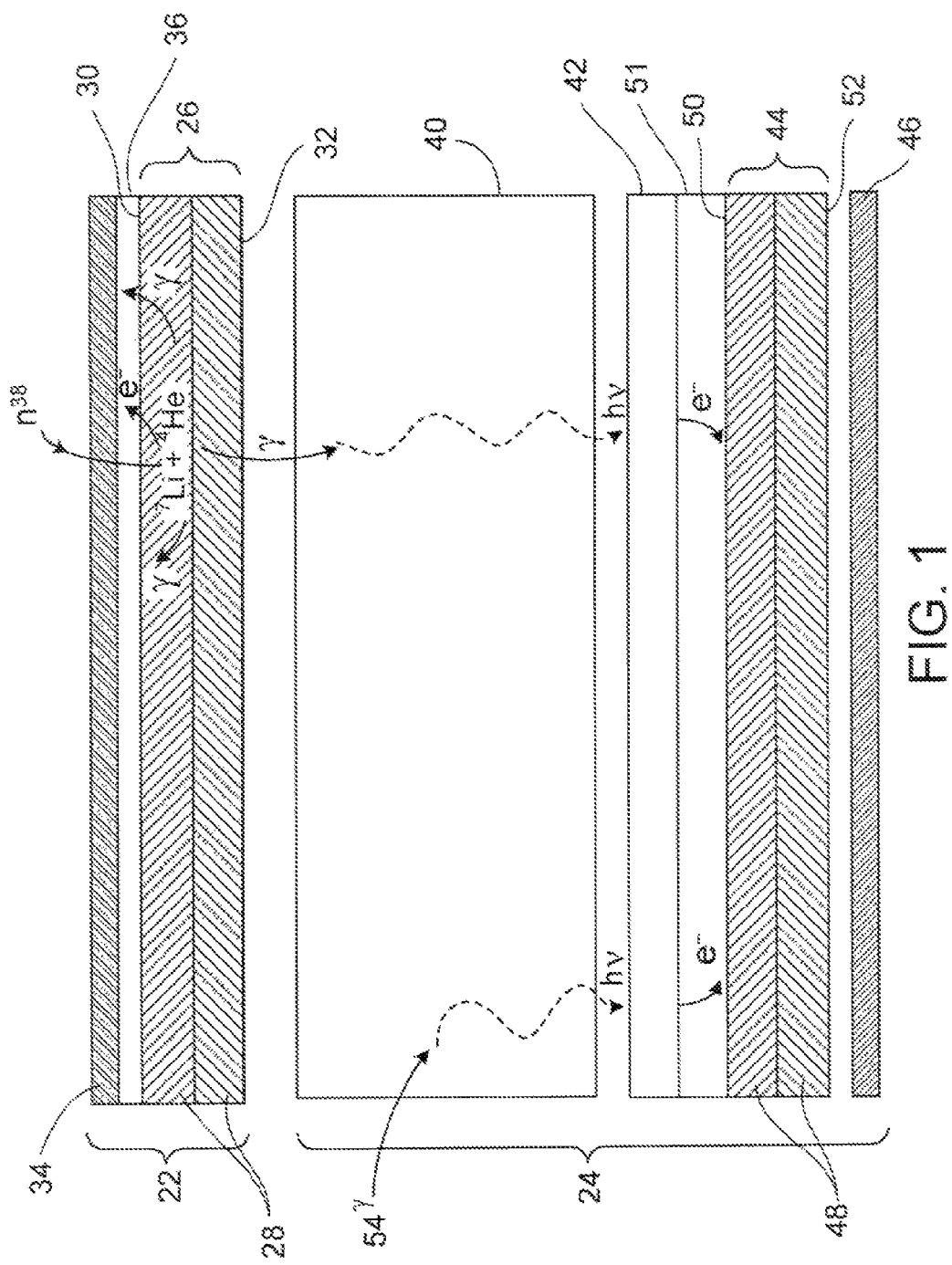
FIG. 1 is a schematic diagram of an embodiment of a detector of neutrons and gamma radiation.

FIG. 1 is a schematic diagram of an embodiment of a detector 20 capable of detecting and measuring both neutrons and gamma radiation. As shown, detector 20 is a wholly solid state device that can be packaged in a small (e.g., hand-held) unit with an on-board power supply and electronics. Detector 20 does not include, for example, a gas-based detector such as a helium-based detector. Detector 20 includes a first component 22 that serves as a neutron detector that can also detect gamma radiation, and a second component 24 that serves as a neutron coincidence counter and a gamma detector. As described below, in serving as a neutron coincidence counter, second component 24 can confirm with high confidence that a neutron was detected by first component 22.

First component 22 includes a neutron detector that uses a microchannel plate (MCP). As shown in FIG. 1, first component 22 includes an MCP stack 26 having one or more (as shown, two) MCPs 28 stacked together. MCP stack 26 has a top electrode 30 connected to a more positive voltage, and a bottom electrode 32 connected to a more negative voltage. An anode 34 is provided to collect electron emissions from MCP stack 26. MCP stack 26 and anode 34 are housed within a vacuum chamber 36.

MCP 28 is sensitive to both neutrons and gamma rays. MCP 28 can include an array of microscopic channels each having a diameter of about, e.g., 5 microns. Each channel can have, e.g., a circular, square, rectangular, or hexagonal cross section. Each channel serves as an independent electron multiplier and has an inner wall surface formed of a semi-conductive and electron emissive layer. MCP 28 can further include (e.g., is made from) a neutron-sensitive glass (e.g., a boron-10 or gadolinium doped alkali lead silicate glass having 5 mol % or more of boron-10 oxide, or 2 mol % or more of gadolinium oxide) that forms the walls that define the channels. For example, MCP 28 can be model NVN-7, available from Nova Scientific, Inc., Sturbridge, Mass. When a boron-10 particle captures a neutron 38, an alpha particle ($^4$He) and a lithium-7 particle are released, as in the reaction below:

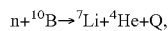

where Q is the energy released in the reaction. One or both of the lithium-7 and helium-4 particles pass out of the glass and enter one or more adjacent channels, freeing electrons along the way. Top electrode 30 of MCP stack 26 has a more positive DC bias voltage than bottom electrode 32 of the MCP stack. The DC bias voltage generates an electric field (e.g., about 1 kV/mm) that attracts the free electrons toward top electrode 30. As the electrons bounce against the channel walls, more electrons are released to form a cascade of electrons. The signal at anode 34 is read out and sent to a signal processor, such as a coincidence unit 112 (see FIG. 2), for comparison with a readout signal from second component 24, as described below.

But first component 22 including MCPs 28 can also detect gamma rays (with an efficiency of about 1% to 3%, which is typical of lead-containing MCP glasses) that cause cascades of electrons in the channels. In some embodiments, MCP 28 can be configured to have low sensitivity to gamma rays, as described in co-pending U.S. patent application Ser. No. 11/522,855, filed Sep. 18, 2006, and titled "Neutron Detection". Thus, when neutron detecting first component 22 generates a detection signal, the detection signal can indicate either detection of a neutron or detection of a gamma ray. That is, a readout signal from anode 34 may indicate detection of a neutron or a gamma ray but typically does not provide information on whether a neutron or a gamma ray is detected.

Second component 24 is used to determine whether a neutron has been detected by first component 22, as well as to detect and to measure gamma radiation. Second component 24 includes a fast scintillator crystal 40 (such as a LaBr3:Ce scintillator crystal, BrilLianCe®380 crystal, from Saint-Gobain Crystals, Newbury, Ohio), a photocathode 42, an MCP stack 44, and an anode 46. In some embodiments, it is desirable to have scintillator crystal 40 in very close proximity to the neutron-sensitive MCP stack 26 to capture the largest solid angle possible. Scintillator crystal can have a response time of <50 nsec or shorter. MCP stack 44 includes one or more (as shown, two) MCPs 48, a top electrode 50 connected to a more negative voltage, and a bottom electrode 52 connected to a more positive voltage. Examples of MCPs include those commercially available from Burle Industries, Hamamatsu Corporation, and Photonis, those similar to MCPs 28 but without a neutron-sensitive material, and those described in U.S. Pat. No. 6,828,714; and U.S. Patent Application Publications 2003/0205956, 2004/0256967, 2005/0205798, all hereby incorporated by reference. Photocathode 42, MCP stack 44 and anode 46 are housed within a vacuum chamber 51.

Still referring to FIG. 1, second component 24 can be used to measure gamma radiation (e.g., collect the amount of gamma rays per second) emitted from an object. For example, the intensity(ies) of the emitted gamma radiation can be measured, e.g., as counts per second, for each energy level detected to provide an energy spectrum. The energy spectrum can be used to identify the source of the radiation, e.g., technetium, uranium, and/or plutonium. Upon receiving an incident gamma ray 54, scintillator crystal 40 emits scintillation light photons that are converted by photocathode 42 to photoelectrons. The photoelectrons are amplified by MCP stack 44 to form an electron cascade, which is detected as a readout signal at anode 46 and sent to a signal processor (e.g., to count the amount of gamma radiation detected).

In addition to measuring gamma radiation, second component 24 can also determine whether MCP stack 26 of first component 22 detected a neutron or a gamma ray. More specifically, scintillator crystal 40, which has a fast response, is used to detect a gamma ray that is generated as a result of a neutron capture reaction in MCP stack 26. For example, when boron-10 captures a neutron, the boron-10 nucleus fissions into an alpha particle (helium-4 ion) and a lithium-7 ion traveling in opposite directions. There is about 94% probability that the lithium-7 ion will initially be in an excited state, upon which the lithium-7 ion decays to a lower energy state and isotropically emits a gamma ray (e.g., a 478 keV gamma ray). If the emitted gamma ray travels towards scintillator crystal 40, the gamma ray can be detected by the gamma ray detector of second component 24, as described above.

By measuring a time proximity of a signal from MCP stack 26 of first component 22 and a signal (e.g., from the emitted gamma ray) from second component 24, one can determine whether a neutron has been detected by the MCP detector of the first component. In other words, a signal from MCP stack 26 can indicate detection of a neutron or a gamma ray. But when a neutron 38 is detected by MCP stack 26 of first component 22, there is a likelihood that the gamma ray detector of second component 24 will also detect a prompt gamma ray from the neutron capture reaction within a very short period of time, e.g., less than 100 ps. Thus, if coincidence events are detected in which a signal from the gamma ray detector of second component 24 occurs within a timing coincidence window of about, e.g., 10 ns, of the occurrence of a signal from MCP stack 26, then there is a high likelihood that a neutron absorption event accompanied by gamma ray emission has occurred and a valid neutron event can be positively tagged with high confidence. The timing coincidence window of about 10 ns is short enough to statistically exclude most background gamma rays (even with gamma flux rates in the MHz region) so false positive detection of neutrons can be reduced significantly.

Figure 2:
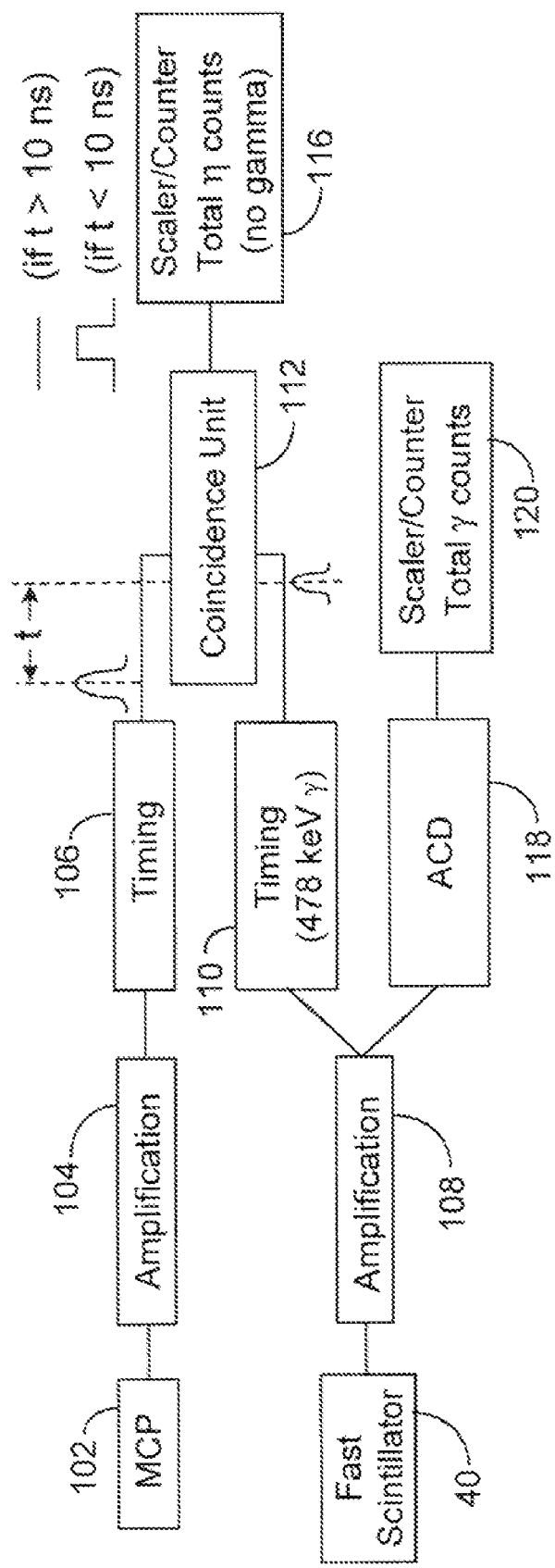
FIG. 2 is a block diagram of an embodiment of a detection system for neutrons and gamma radiation.

FIG. 2 is a block diagram of a system 100 that can determine a neutron flux, e.g., the amount of neutrons per second, emitted from an object, and determine a gamma radiation flux, e.g., emitted from an object and/or from an environment. System 140 includes a neutron-sensitive MCP detector 102, similar to that shown in FIG. 1, including first component 22 and second component 24. As shown, the output signal of MCP detector 102 is sent to an amplifier 104 (e.g., a scintillator crystal and MCP assembly, a scintillator crystal and photomultiplier tube assembly, or a scintillator crystal-avalanche photodiode) to amplify the signals received at anode 34 of MCP detector 102, and the output of amplifier 104 is sent to a timing module 106. As shown, the output of scintillator crystal 40 (which is indicative of detection of gamma radiation emitted from a neutron capture) is sent to an amplifier 108 (e.g., photocathode 42-MCP stack 44 assembly and detected by anode 46), and the output from the amplifier is sent to a timing module 110. Timing modules 106 and 110 condition their corresponding input signals, taking into consideration the different signal paths traveled by the input signals to a coincidence unit 112. The outputs of the timing modules 106 and 110 are sent to coincidence unit 112, which determines whether the signal from timing module 110 occurs within the timing coincidence window (e.g., 10 ns) of the signal from timing module 106. Coincidence unit 112 can be, e.g., model 2040, from Canberra, Meriden, Conn.

Coincidence unit 112 determines a time difference between a signal received from timing module 106 and a later signal received from timing module 110, and compares the time difference with the present timing coincidence window. If the time difference is less than the timing coincidence window (e.g., 10 ns), coincidence unit 112 generates a pulse 114 that is sent to a scaler/counter 116, indicating a neutron event. Counter 116 can be configured to count the number of neutron events per unit of time (e.g., second). Counter 116 can be, e.g., model 512, from Canberra. The output signal of counter 116 can be sent to a computer or data acquisition device for recording and analysis of the signal.

If there is no coincidence, e.g., 10 ns, between the output signals of MCP detector 102 and scintillator 40, then either (i) a gamma ray of arbitrary energy is detected by MCP detector 102, and no gamma ray is detected by the scintillator 40 within the 10 ns timing window, or (ii) a gamma ray is detected by scintillator 40 but no corresponding neutron signal is detected by MCP detector 102.

The probability that a gamma ray is detected within a 10 ns timing window, and another background gamma ray of any energy being detected by MCP detector 102 (which has 1% to 3% detection efficiency to gamma rays), is very small. Because there is about 94% probability that the boron-10 and neutron reaction will generate a lithium-7 ion in the excited state that decays with an emission of a 478 keV gamma ray, there is a probability of about 6% that neutron events would not result in an emission of a gamma ray, e.g., a 478 keV gamma rays resulting from the neutron capture reaction as possible.

The timing coincidence window can have values different from what is described above, e.g., about 10 to 50 ns.

A neutron shield can be positioned between first component 22 and second component 24 to shield the second component from neutrons.

Alternatively or additionally to using boron-10 to capture neutrons, other materials can also be used. For example, MCPs 48 can be made of glass doped with gadolinium (Gd) that can capture neutrons as in the following reactions:

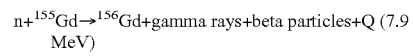
$$n + {}^{155}Gd \rightarrow {}^{156}Gd + \text{gamma rays} + \text{beta particles} + Q\ (7.9\ \text{MeV})$$

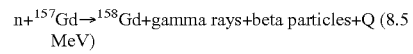
$$n + {}^{157}Gd \rightarrow {}^{158}Gd + \text{gamma rays} + \text{beta particles} + Q\ (8.5\ \text{MeV})$$

When gadolinium atoms capture neutrons, gamma rays (e.g., sub-200 keV gamma rays) are emitted simultaneously and can be detected by second component 24.

Other embodiments of MCPs, including neutron-sensitive MCPs, are described in U.S. Pat. No. 6,828,714; and U.S. Patent Application Publications 2003/0205956, 2004/0256967, 2005/0205798.

All references, such as patents, patent applications, and publications, referred to above are incorporated by reference in their entirety.

What is claimed is:

1. A method comprising:
   determining that a neutron has been detected by detecting a time proximity between a first signal and a second signal, the first signal indicating detection of at least one of a neutron and a gamma ray without indicating whether a neutron or a gamma ray has been detected, the second signal indicating detection of a gamma ray; and
   measuring an amount of detected gamma rays.

2. The method of claim 1, further comprising generating the first signal using a micro channel plate detector.

3. The method of claim 1, further comprising generating the second signal using a gamma ray detector.

4. The method of claim 1, further comprising determining whether the second signal occurred within a specified time period after occurrence of the first signal.

5. The method of claim 4, wherein the specified time period is less than 50 nanoseconds.

6. The method of claim 4, wherein the specified time period is less than 10 nanoseconds.

7. The method of claim 1, wherein detecting the neutron comprises capturing the neutron using a boron-10 particle and generating alpha and lithium-7 particles.

8. The method of claim 1, wherein detecting a neutron comprises detecting a gamma ray within less than 50 ns after a microchannel plate detector generates an output pulse indicating detection of a neutron or a gamma ray.

9. The method of claim 1, wherein measuring the amount of detected gamma rays comprises using a micro channel plate.

10. The method of claim 1, wherein measuring the amount of detected gamma rays comprises using a photomultiplier tube.

11. The method of claim 1, wherein measuring the amount of detected gamma rays comprises using an avalanche photodiode.

12. The method of claim 1, further comprising totaling an amount of gamma rays detected.

13. The method of claim 12, further comprising distinguishing the totaled amount of gamma rays detected from the amount detected and associated with the second signal.

14. A method comprising:
generating a first signal using a micro channel plate detector, the first signal indicating detection of at least one of a neutron and a gamma ray without indicating whether a neutron or a gamma ray has been detected;
generating a second signal using a gamma ray detector, the second signal indicating detection of a gamma ray;
generating a third signal indicating that a neutron has been detected by the microchannel plate detector if the second signal occurs within a predetermined time period after occurrence of the first signal; and
measuring occurrence of the second signal.

15. The method of claim 14, further comprising comparing a time difference between occurrence of the first signal and occurrence of the second signal.

16. The method of claim 14, wherein generating the first signal comprises generating the first signal using a microchannel plate detector.

17. The method of claim 14, wherein generating the first signal comprises:
generating an alpha particle and a lithium-7 particle; and
inducing secondary electron emissions.

18. The method of claim 14, wherein the predetermined period of time is less than 50 nanoseconds.

19. The method of claim 14, wherein measuring occurrence of the second signal comprises using a micro channel plate.

20. The method of claim 14, wherein measuring occurrence of the second signal comprises using a photomultiplier tube.

21. The method of claim 14, wherein measuring occurrence of the second signal comprises using an avalanche photodiode.

22. The method of claim 14, further comprising totaling an amount of gamma ray detected.

23. The method of claim 22, further comprising distinguishing the totaled amount of gamma rays detected from an amount of gamma rays associated with the second signal.

24. The method of claim 14, comprising measuring an amount of gamma rays per second detected by the gamma ray detector, and generating an energy spectrum of at least some of the gamma rays detected by the gamma ray detector.

25. The method of claim 24, comprising identifying a source of the gamma radiation based on the energy spectrum.

26. An apparatus comprising:
a neutron detector that generates a signal indicating detection of a neutron after detecting a time proximity between a first signal and a second signal, the first signal indicating detection of at least one of a neutron and a gamma ray without indicating whether a neutron or a gamma ray has been detected, the second signal indicating detection of a gamma ray; and
a device that measures an amount of detected gamma rays.

27. The apparatus of claim 26, wherein the neutron detector comprises a microchannel plate detector that generates the first signal.

28. The apparatus of claim 27, wherein the microchannel plate detector comprises glass doped with boron-10.

29. The apparatus of claim 27, wherein the microchannel plate detector comprises glass doped with gadolinium.

30. The apparatus of claim 26, wherein the neutron detector comprises a gamma ray detector that generates the second signal.

31. The apparatus of claim 26, wherein the neutron detector comprises a signal processor that determines whether the second signal occurs within a specified time period after occurrence of the first signal.

32. The apparatus of claim 31, wherein the specified time period is less than 50 nanoseconds.

33. The apparatus of claim 31, wherein the specified time period is less than 10 nanoseconds.

34. The apparatus of claim 26, wherein the device comprises a microchannel plate.

35. The apparatus of claim 26, wherein the device comprises a photomultiplier tube.

36. The apparatus of claim 26, wherein the device comprises an avalanche photodiode.

37. An apparatus comprising:
a first microchannel plate detector to generate a first detection signal upon detection of at least one of a neutron and a gamma ray without information on whether a neutron or a gamma ray has been detected;
a gamma ray detector to generate a second detection signal upon detection of a gamma ray;
a signal processor to generate a third signal indicating a detection of a neutron upon receiving the first and second detection signals and determining that the second detection signal occurred within a predetermined period of time after occurrence of the first detection signal; and
a second micro channel plate spaced from the first micro channel plate detector.

38. The apparatus of claim 37, wherein the first micro channel plate detector comprises glass doped with at least one of boron-10 and gadolinium.

39. The apparatus of claim 37, wherein the first microchannel plate detector comprises a first particle that, upon capture of a neutron, generates a second particle in an excited state that subsequently decays to a lower energy state and emits a gamma ray.

40. The apparatus of claim 37, wherein the gamma ray detector comprises a scintillator.

41. The apparatus of claim 37, wherein the predetermined period of time is less than 50 nanoseconds.

42. The apparatus of claim 37, wherein the second microchannel plate is substantially free of a neutron-sensitive material.

43. The apparatus of claim 37 in which the gamma ray detector also measures an amount of gamma rays per second, and the signal processor generates an energy spectrum of at least some of the gamma rays detected by the gamma ray detector.

* * * * *